(12) United States Patent
Chibon et al.

(10) Patent No.: US 12,079,110 B2
(45) Date of Patent: Sep. 3, 2024

(54) USING CLUSTERS TO CREATE TEST INSTANCES

(71) Applicant: Red Hat, Inc., Raleigh, NC (US)

(72) Inventors: Pierre-Yves Chibon, Saint-Pol-de-léon (FR); Leigh Griffin, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 139 days.

(21) Appl. No.: 17/703,758

(22) Filed: Mar. 24, 2022

(65) Prior Publication Data
US 2023/0305947 A1  Sep. 28, 2023

(51) Int. Cl.
G06F 11/36 (2006.01)

(52) U.S. Cl.
CPC ...... *G06F 11/3664* (2013.01); *G06F 11/3684* (2013.01); *G06F 11/3688* (2013.01); *G06F 11/3692* (2013.01)

(58) Field of Classification Search
CPC ............. G06F 11/3664; G06F 11/3684; G06F 11/3688; G06F 11/3692
See application file for complete search history.

(56) References Cited

U.S. PATENT DOCUMENTS

| | | | |
|---|---|---|---|
| 8,719,787 B2* | 5/2014 | Alger ................ | G06F 8/60 717/124 |
| 10,353,803 B2* | 7/2019 | Lee .................... | G06F 11/3414 |
| 11,048,491 B1 | 6/2021 | Davies et al. | |
| 11,068,384 B2 | 7/2021 | Zhang et al. | |
| 11,093,377 B2 | 8/2021 | Burrell et al. | |
| 11,151,019 B2 | 10/2021 | Subramanian Jayaraman et al. | |
| 11,323,524 B1* | 5/2022 | Gussin ................ | H04L 61/5007 |
| 2007/0100903 A1* | 5/2007 | Cherry ................ | G06F 8/71 |
| 2012/0227030 A1* | 9/2012 | Radez ................. | G06F 9/44536 717/120 |
| 2017/0171022 A1 | 6/2017 | Hamer | |

(Continued)

FOREIGN PATENT DOCUMENTS

| | | |
|---|---|---|
| CN | 110609732 A | 12/2019 |
| CN | 112148329 A | 12/2020 |

OTHER PUBLICATIONS

Poniszewska-Marańda, Aneta, and Ewa Czechowska. "Kubernetes cluster for automating software production environment." Sensors 21.5 (2021): 1910. (Year: 2021).*

(Continued)

*Primary Examiner* — Marina Lee
(74) *Attorney, Agent, or Firm* — Womble Bond Dickinson (US) LLP (57) ABSTRACT

Described is a system and method that includes executing, by a processing device, a staging creation service (SCS) to monitor a development of an application in a development environment of the application. The method includes removing, by the SCS, a production cluster of a plurality of production clusters from a production cluster pool in response to one or more development tests of the application having passed in the development environment. Each production cluster of the plurality of production clusters comprises a production environment of the application. The method includes assigning, by the SCS, the production cluster to be a staging cluster comprising a staging environment of the application to perform one or more staging tests of the application.

20 Claims, 6 Drawing Sheets

400

Executing, by a processing device, a SCS to monitor a development of an application in a development environment of the application
402

↓

Removing, by the SCS, a production cluster of a plurality of production clusters from a production cluster pool in response to one or more development tests of the application having passed in the development environment
404

↓

Assigning, by the SCS, the production cluster to be a staging cluster, wherein the staging cluster comprises a staging environment of the application to perform one or more staging tests of the application
406

(56) References Cited

U.S. PATENT DOCUMENTS

| | | |
|---|---|---|
| 2017/0344584 A1 | 11/2017 | Parappalliyalil et al. |
| 2019/0057019 A1* | 2/2019 | Lee .................... G06F 11/3664 |
| 2020/0250074 A1 | 8/2020 | Zhang et al. |
| 2021/0271692 A1 | 9/2021 | Kumar et al. |
| 2022/0215303 A1* | 7/2022 | Thiruvengadathan .... G06F 8/61 |
| 2022/0222052 A1* | 7/2022 | Watt ........................ G06F 8/71 |

OTHER PUBLICATIONS

Hogeveen, Nynke. "Using production data for testing", DATAPROF, located on the Internet at: https://www.datprof.com/blogs/using-production-data-for-testing/ (Oct. 17, 2019), 8 pages.

Peeples, Jeff. "Making Test Data Management (TDM) Easier With Data Simulation", PARASOFT, located on the Internet at: https://www.parasoft.com/blog/making-test-data-management-tdm-easier-with-data-simulation/ (Aug. 8, 2021), 6 pages.

Extended European Search Report for counterpart European Patent Application No. 22197574.1 (May 23, 2023), 10 pp. total.

\* cited by examiner

Executing, by a processing device, a SCS to monitor a development of an application in a development environment of the application
402

Removing, by the SCS, a production cluster of a plurality of production clusters from a production cluster pool in response to one or more development tests of the application having passed in the development environment
404

Assigning, by the SCS, the production cluster to be a staging cluster, wherein the staging cluster comprises a staging environment of the application to perform one or more staging tests of the application
406

Synchronizing, by the SCS, updates of the application in the development environment to the application in the staging cluster
508

Mirroring, by the SCS, changes in other production clusters in the production cluster pool to the staging cluster such that the staging cluster is synchronized to the production environment in real time
510

Returning, by the SCS, the staging cluster to the production cluster pool to be a returned production cluster in the plurality of production clusters, in response to the application being validated in the one or more staging tests in the staging environment
512

Cross synchronizing the other production clusters in the production cluster pool with the returned production cluster to deploy the application across the plurality of production clusters
514

USING CLUSTERS TO CREATE TEST INSTANCES

BACKGROUND

An application may be one or more programs (e.g., computer programs), software, etc., that may be used by users, other applications, devices, etc., to perform various tasks, actions, functions, operations, methods, processes, calculations, etc. The testing of the application, or modules and components of the application, may take place over a number of environments. Deployment of an application may start at a development environment, and end at a production environment.

When testing the application before pushing it to the production environment, the application may be tested in conditions that are as close to the production environment as possible. This includes the databases and file systems. Currently, to achieve this, a snapshot of the production environment may be taken and deployed to create a staging environment. This may be a very manual process which can be very time consuming. For example, the database or the amount of data to synchronize from the production environment to the test instance in the staging environment may be very large.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Deployment of an application, a program, or a service may start at a development environment, and end at a production environment. As an example, an environment may be a collection of processes, procedures and/or tools for developing, testing, debugging and/or run the application, program or service. As another example, an environment may be a computer system or a set of systems in which the application or program may be deployed and/or executed. The development environment may be an environment in which changes to software are developed. The production environment may be an environment that users directly interact with.

When testing the application, program or service before pushing it to the production environment, the application, program or service may be tested in conditions that are as close to the production environment as possible. This includes the databases and file systems. Before the production environment, there may be a staging environment which may be a nearly exact replica of the production environment for software testing. The staging environment may be an environment for testing that exactly resembles the production environment. The staging environment seeks to mirror the actual production environment as closely as possible and may connect to other production services and data, such as databases. The staging environment may have a copy of the same configurations of hardware, servers, databases, and caches of the production environment.

Currently, a snapshot of the production environment may be taken and deployed to create the staging environment. This may be a very manual process which can be very time consuming. For example, the database or the amount of data to synchronize from the production environment to the test instance in the staging environment may be very large.

Aspects of the present disclosure address the above noted and other deficiencies by using a production cluster pool with multiple production clusters which may have multiple copies of the production environment (e.g., production server) of an application running for redundancy. A staging creation service (SCS) may be executed to monitor the development environment and the production environment of an application, program or service. When a set of development tests of the application have passed in the development environment and a push to a staging environment should occur, the SCS may take a production cluster out of the cluster pool and designate the production cluster as a new staging cluster or instance. The staging cluster may provide a dynamic just in time snapshot of the production environment. The SCS may be a part of the production cluster pool. When changes may happen in the other production clusters, the SCS may mirror the changes down to the new staging cluster or instance. Thus, the new staging cluster or instance may be consistently synchronized to the production environment in real time. The updates from the development environment may be synchronized via the SCS. The next suite of tests, which may be the staging tests, may be run on the new staging cluster or instance. When the staging tests are complete, the SCS may bring the staging cluster or instance back to the production cluster pool to be a production cluster. The other production clusters (e.g., servers) may be cross synchronized with the returned production cluster. For example, the production clusters (e.g., servers) may be taken offline and being cross synchronized and/or updated. In this way, an efficient and a resilient approach to update the production environment is provided, e.g., in a continuous development (CD) model. Advantageously, the staging environment is always available and may be created dynamically. Accordingly, the embodiments of the present disclosure reduce the amount of resources, time and power consumption to create the staging environment, and improve the efficiency to deploy the application in the production environment.

Figure 1:
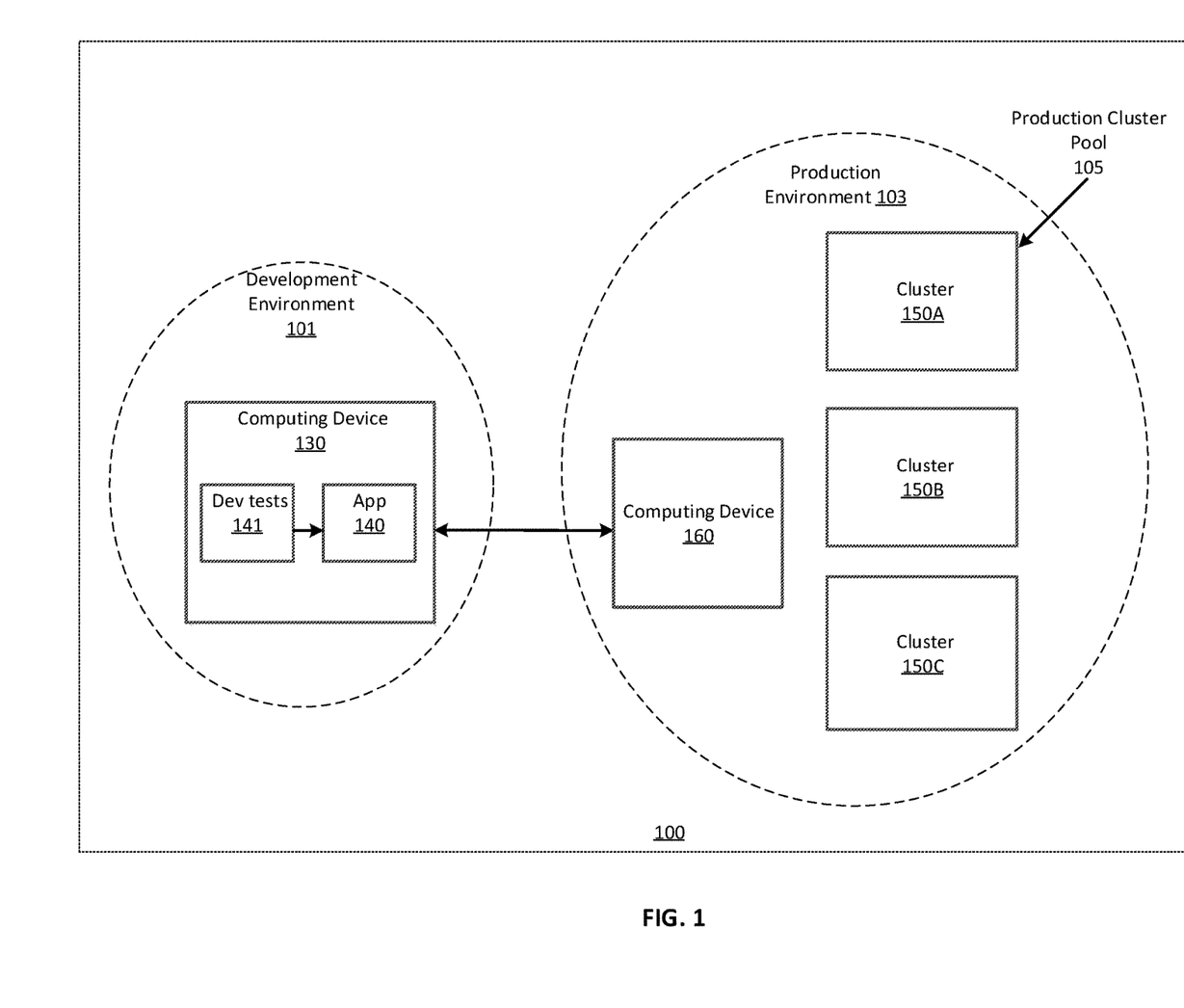
FIG. 1 is a block diagram illustrating an example of a deployment system, in accordance with some embodiments of the present disclosure.

FIG. 1 is a block diagram illustrating an example of a deployment system 100, in accordance with some embodiments of the present disclosure. In one embodiment, the deployment system 100 may be a system for a deployment of an application 140. As discussed above, the application 140 may be one or more programs (e.g., computer programs), software, etc., that may be used by users, other applications, devices, etc., to perform various tasks, actions, functions, operations, methods, processes, calculations, etc. The application 140 may be associated with a service to the users. Referring to FIG. 1, the deployment system 100 may include a computing device 130 which may include a development environment 101 of the application 140. Though only the computing device 130 is illustrated, the development environment 101 may include any appropriate number of computing devices which may include the development environment 101. The deployment system 100 may include a production cluster pool 105 which may include a computing device 160 and clusters 150A-150C, and each cluster 150 may include a production environment 103. Though only the clusters 150A-150C are illustrated, the production cluster pool 105 may include any appropriate number of clusters. Although illustrated as having only the computing device 130, the computing device 160 and clusters 150A-150C for simplicity, the deployment system 100 may include any appropriate number of components (e.g., network devices, computing devices, containers, virtual machines, applications).

FIG. 1 and the other figures may use like reference numerals to identify like elements. A letter after a reference numeral, such as "150A," indicates that the text refers specifically to the element having that particular reference numeral. A reference numeral in the text without a following letter, such as "150," refers to any or all of the elements in the figures bearing that reference numeral.

The components of the deployment system 100 may be connected as part of a public network (e.g., the internet), a private network (e.g., a local area network (LAN) or wide area network (WAN)), or a combination thereof. In one embodiment, deployment system 100 may include a wired or a wireless infrastructure, which may be provided by one or more wireless communications systems, such as a WiFi™ hotspot connected with the deployment system 100 and/or a wireless carrier system that can be implemented using various data processing equipment, communication towers (e.g. cell towers), etc. The deployment system 100 may also include various components such as switches, routers, bridges, gateways, servers, computers, cables, virtual machines, integrated circuits, etc. which may carry communications (e.g., data, messages, packets, frames, etc.) between the computing device 130 and clusters 150 as well as any other components of deployment system 100.

In one embodiment, the computing device 130, the computing device 160 and each cluster 150 may include hardware such as processing devices (e.g., processors, central processing units (CPUs), memory (e.g., random access memory (RAM), storage devices (e.g., hard-disk drive (HDD), solid-state drive (SSD), etc.), and other hardware devices (e.g., sound card, video card, etc.). The computing device 130 and clusters 150 may each comprise any suitable type of computing device(s) or machine(s) that has a programmable processor including, for example, server computers, desktop computers, laptop computers, tablet computers, smartphones, set-top boxes, etc. The clusters 150 may be a single machine or may include multiple interconnected machines (e.g., multiple computers configured in a cluster). In another embodiment, the computing device 130 and/or clusters 150 may be a virtual machine (VM). A VM may be an emulation of a computing device. The VM may execute on a hypervisor (not shown) which executes on top of an operating system for a host computing device. The hypervisor may manage system resources (e.g., may manage access to hardware devices, such as processors, memories, storage devices, etc., of the host computing device). The hypervisor may also emulate the hardware (or other physical resources) which may be used by the VMs to execute software and/or applications.

The development pipeline (or process) of the application 140 may be a cyclical pipeline. One type of development pipe line may be a continuous integration continuation delivery (CI/CD) pipeline. A CI/CD pipeline may be a pipeline or process where an application, or modules and components of the application, are built (e.g., compiled), tested, and deployed (e.g., released to users) in shorter time periods. For example, new code for the application may be built, tested, and deployed every few hours, every day, or every appropriate time period. The testing of the application, or modules and components of the application, may take place over a number of environments, e.g., the development environment 101, the production environment 103.

Each environment may have one or more gates associated with it, all of which must be "passed" by the application or code of the application in order to move to the next environment. Stated differently, the application must meet the criteria specified by each gate associated with the environment in order to move to the next environment. As an example, the development environment 101 may have a gate which may include a set of development tests 141. For example, the set of development tests 141 may include continuous integration/continuous deployment (CI/CD) oriented tests such as unit tests, integration tests, security scanning tests, static analysis test, etc. After having passed the set of development tests 141, the application 140 may be ready to be promoted to a next environment. The passing of the set of development tests 141 may be an indicator to promote the application 140 to the next environment and/or the next environment is needed to test the application 140.

The production cluster pool 105 which may include the computing device 160 and clusters 150. The production cluster pool 105 may include multiple production clusters 150 which may have multiple copies of the production environment 103 (e.g., production server) of the application running for redundancy. As an example, cluster 150A, cluster 150B, and cluster 150C may have redundant copies of the production environment 103 (e.g., production server) of the application running. Each production cluster 150 may include the production environment 103 of the application 140. The production cluster pool 105 may include the computer device 160, which may perform the functions of managing and scheduling the multiple production clusters 150. In one embodiment, the computer device 160 may be a master cluster. In one embodiment, the computer device 160 may be one of the multiple production clusters 150 which has the capabilities of performing the functions of managing and scheduling the multiple production clusters.

The cluster 150 may include a set of nodes that work together so that they may be viewed as a single system, while each node may perform the same task, controlled and scheduled by software. Each cluster 150 may include two or more nodes (or members) that work together to perform the task. The nodes of a cluster 150 may comprise computing devices, virtual machines, or any combination thereof. Each cluster 150 may include cluster management software (not shown) that provides fundamental functions for the nodes to work together as a cluster (e.g., configuration-file management, membership management, lock management, and fencing). Each production cluster 150 may include a master node that acts as the unified endpoint for the cluster. The production cluster 150 may use a high-availability (HA)

approach, which may improve the availability of the cluster 150. The HA approach may operate by having redundant nodes, which are then used to provide service when system components fail. HA cluster implementations attempt to use redundancy of cluster components to eliminate single points of failure.

Figure 2:
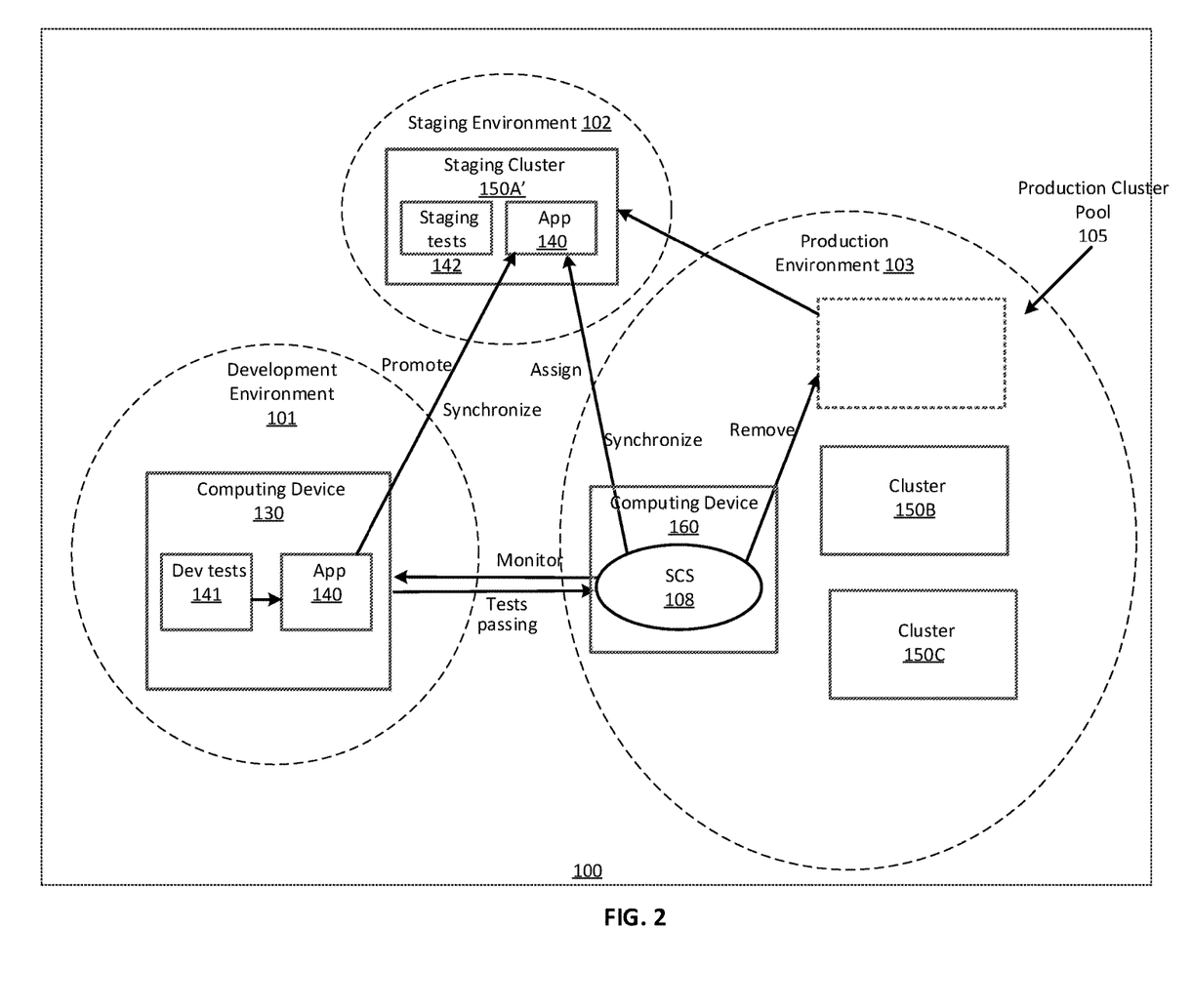
FIG. 2 is a block diagram illustrating an example of a deployment system, in accordance with some embodiments of the present disclosure.

FIG. 2 is a block diagram illustrating an example of the deployment system 100, in accordance with some embodiments of the present disclosure. When testing the application 140 before pushing it to the production environment 103, the application 140 may be tested in conditions that are as close to the production environment 103 as possible. This includes the databases and file systems. Before the production environment 103, there may be a staging environment 102 which may be a nearly exact replica of the production environment 103. The staging environment 102 may be an environment for testing that exactly resembles the production environment 103. The staging environment 102 may mirror the actual production environment 103 as closely as possible and may connect to other production services and data, such as databases. The staging environment 102 may have a copy of the same configurations of hardware, servers, databases, and caches of the production environment.

In some embodiments, a staging creation service (SCS) 108 is created and executed, for example, in the computing device 160 which may perform the functions of managing and scheduling the multiple production clusters 150. The SCS 108 monitors the development environment 101 of the application 140. The SCS may monitor the production environment 103 of the application, 140 as well. When the set of development tests of the application have passed in the development environment 101 and a push to the staging environment 102 occurs, the SCS 108 takes a production cluster 150A out of the production cluster pool 105. The SCS 108 designates the production cluster 150A as a staging cluster (or instance) 150A'. In one embodiment, the staging cluster (or instance) 150A' includes the staging environment 102 of the application 140. In one embodiment, the staging cluster (or instance) 150A' is the staging environment 102 of the application 140. As an example, the SCS 108 may disconnect the production cluster 150A from the production cluster pool 105, and relabels or renames the production cluster 150A as the staging cluster 150K. The SCS 108 may inform the deployment system 100 (e.g., a CI/CD system) that the staging cluster 150A' include or is the staging environment 102 to perform the staging tests to validate the application. The staging cluster 150A' may be tagged or classified as the staging environment 102 of the application 140 to perform the staging tests to validate the application.

Since each production cluster 150 includes the production environment 103 of the application 140, the production cluster 150A includes the production environment 103. Thus, the staging cluster 150K includes the production environment 103, e.g., databases and file systems. In one embodiment, the staging cluster 150K may provide a dynamic just in time snapshot of the production environment 103. The staging cluster 150K may be created in a timely manner to promote the application 140 from the development environment 101 to the staging environment 102, thereby saving resources and improving the efficiency of deployment.

As the staging cluster (or instance) 150A' is designated to include the staging environment 102, the application 140 may be promoted from the development environment 101 into the staging environment 102, as illustrated in FIG. 2. Since the staging cluster 150K may be a redundant copy of the production environment 103, the staging cluster 150K may mirror the production environment 103 and may be an environment for testing that exactly resembles the production environment 103.

In some embodiments, the SCS 108 may select the production cluster 150A from the plurality of production clusters 150 based on a load of the production cluster 150A. Since removing the production cluster 150A from the production cluster pool 105 may take resources from the production cluster pool 105, a load of each production cluster 150 may be monitored. As an example, if the cluster 150B has a high load due to a large number of users, the cluster 150B may not be selected to the new staging cluster.

Referring to FIG. 2, the SCS 108 may be a part of the production cluster pool 105. When changes may happen in the other production clusters 150B, 150C, the SCS 105 may mirror the changes down to the new staging cluster (or instance) 150A'. In one embodiment, the new staging cluster (or instance) 150A' may be consistently synchronized to the production environment 103 in real time. As an example, updates of the production environment 103 may be dynamically streamed to the new staging cluster (or instance) 150A' via the SCS 108. The new staging cluster (or instance) 150A' may still receive the updates of the production environment 103 on a backend. However, the staging cluster (or instance) 150A' doesn't send changes back to the production cluster pool 105 since the staging tests are being performed in the staging cluster (or instance) 150A'. In another embodiment, the staging cluster 150K may be breaking off from the production cluster pool 105, and may be re-synchronized with the production cluster 150 after returning to the production cluster pool 105.

The application 140 in the development environment 101 may be promoted to be in the staging environment 102. The application 140 may be promoted from the development environment 101 to the staging environment 102. The updates from the development environment 101 may be synchronized via the SCS 108. The next set of tests, which may be a set of staging tests 142, may be run on the new staging cluster (or instance) 150A'. The gate of the staging environment 102 may be the set of staging tests 142 to validate the application 140. After the application 140 is validated in the set of staging tests 142, the application 140 is ready to be deployed in the production environment 103.

Figure 3:
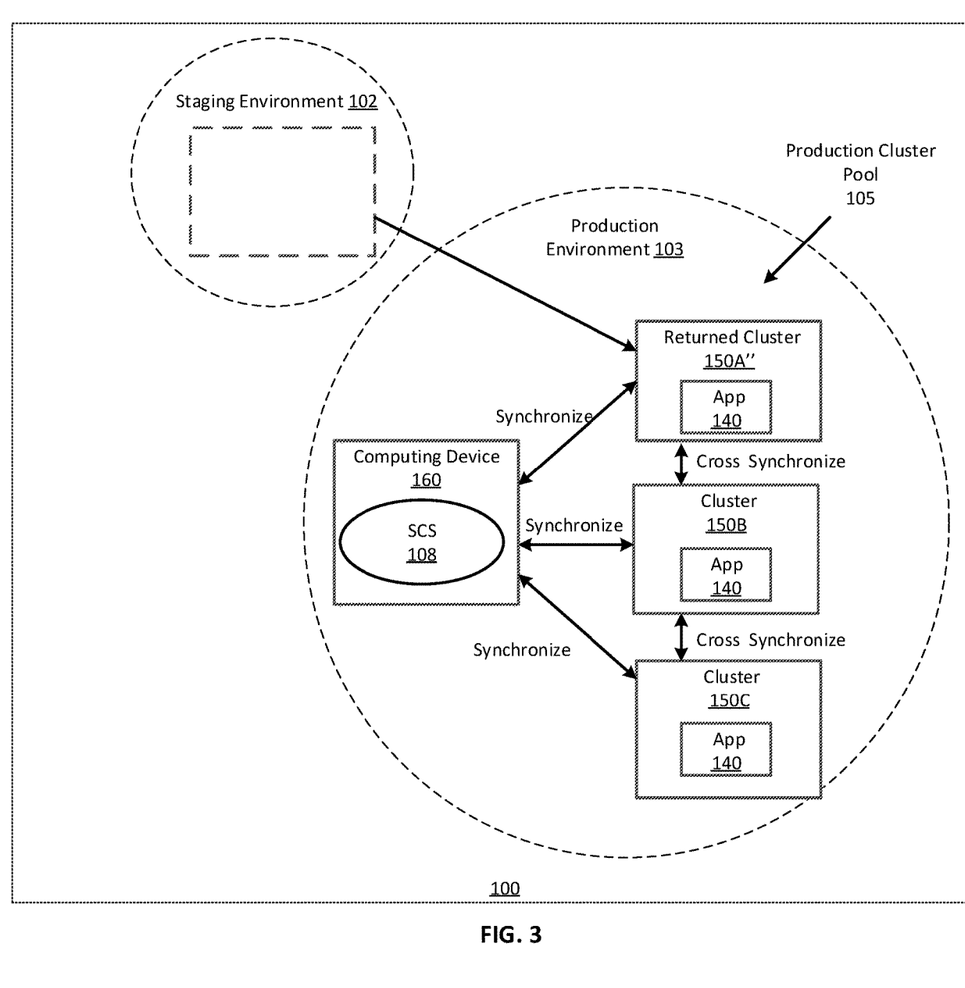
FIG. 3 is a block diagram illustrating an example of a deployment system, in accordance with some embodiments of the present disclosure.

FIG. 3 is a block diagram illustrating an example of the deployment system 100, in accordance with some embodiments of the present disclosure. When the staging tests 142 are complete, the SCS 108 may bring the staging cluster (or instance) 150A' back to the production cluster pool 105 to be a returned production cluster 150A". The SCS 108 may reconnect the returned production cluster 150A" to the production cluster pool 105. The application 140 may have already been deployed in the returned production cluster 150A". The returned production cluster 150A" may have already had access the database, file systems and application programming interface (API) associated with the application 140. The returned production cluster 150A" may have already been working at the level of the production environment. When the returned production cluster 150A" is moved back to the production cluster pool 105, the contents of the staging environment 102 may be moved back in the production cluster pool 105. Then, the computing device 160 may perform cluster management functions to propagate the application 140 across the other production clusters (e.g., servers) 150B, 150C. The other production clusters (e.g., servers) 150B, 150C may be cross synchronized with the returned production cluster 150A" The production cluster 150 may use the HA approach, which may provide resilience and eliminate single points of failure. For example, the production clusters (e.g., servers) 150 may be cross synchronized and/or updated when the returned production cluster 150A" is moved back to the production cluster pool 105. In one embodiment, the production clusters (e.g., servers) 150 may be taken offline to be cross synchronized and/or updated. In one embodiment, the production clusters (e.g., servers) 150 may be cross synchronized and/or updated online. As an example, if a user is trying to access the application or service, the returned production cluster 150A", which was the staging cluster 150', may run the application to perform the service right away.

In this way, an efficient and a resilient approach to update the production environment is provided, e.g., in a CD model. Advantageously, the staging environment 102 is always available and may be created dynamically. Accordingly, the overhead of deploying the production environment to create a staging environment is saved. The application or service may be deployed in the production environment faster and more efficiently. The resources, time and power consumption to deploy the application or service may be reduced.

Figure 4:
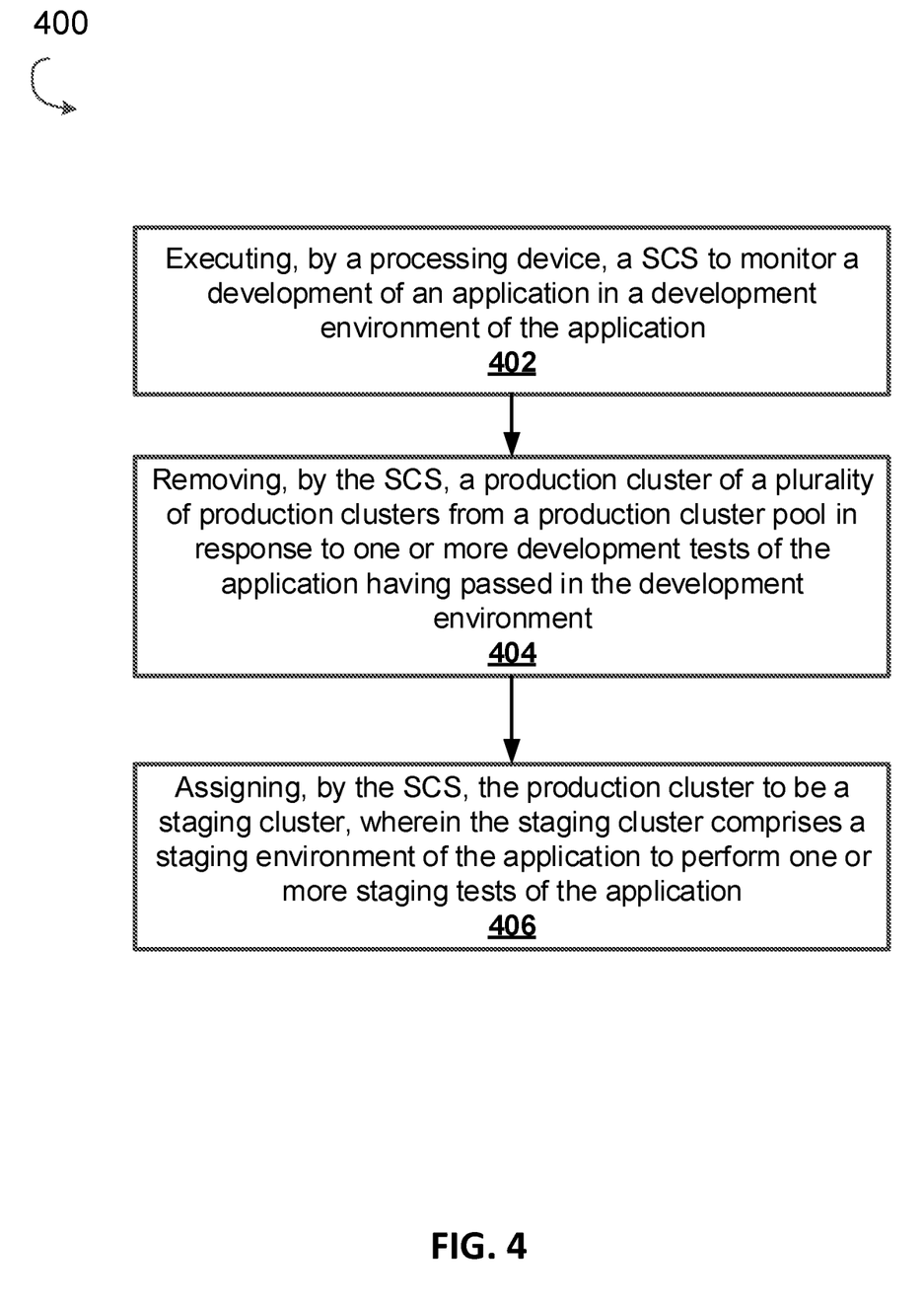
FIG. 4 is a flow diagram of an example method for creating a staging cluster, in accordance with some embodiments of the present disclosure.

FIG. 4 is a flow diagram of an example method 400 for creating a staging cluster, in accordance with some embodiments of the present disclosure. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by a computing device (e.g., the computing device 160 in FIGS. 1-3).

At block 402, processing logic may execute a SCS to monitor a development of an application in a development environment of the application. Referring back to FIGS. 1-3, the SCS 108 is created and executed, for example, in the computing device 160 which may perform the functions of managing and scheduling the multiple production clusters 150. The SCS 108 monitors the development environment 101 of the application 140. The SCS may monitor the production environment 103 of the application, 140 as well.

At block 404, the processing logic may remove, by the SCS, a production cluster of a plurality of production clusters from a production cluster pool in response to one or more development tests of the application having passed in the development environment. The production cluster pool comprises the plurality of production clusters. Each production cluster of the plurality of production clusters includes a production environment of the application. Referring back to FIGS. 1-3, when the set of development tests of the application have passed in the development environment 101 and a push to the staging environment 102 occurs, the SCS 108 takes a production cluster 150A out of the production cluster pool 105.

In some embodiment, the processing logic may select, by the SCS, the production cluster in the plurality of production clusters based on a load of the production cluster. In some embodiment, the application is promoted from the development environment to the staging environment.

At block 406, the processing logic may assign, by the SCS, the production cluster to be a staging cluster. The staging cluster comprises a staging environment of the application to perform one or more staging tests of the application. Referring back to FIGS. 1-3, the SCS 108 designates the production cluster 150A as a staging cluster (or instance) 150A'. In one embodiment, the staging cluster (or instance) 150A' includes the staging environment 102 of the application 140. In one embodiment, the staging cluster (or instance) 150A' is the staging environment 102 of the application 140. As an example, the SCS 108 may disconnect the production cluster 150A from the production cluster pool 105, and relabels or renames the production cluster 150A as the staging cluster 150A'. The SCS 108 may inform the deployment system 100 (e.g., a CI/CD system) that the staging cluster 150A' include or is the staging environment 102 to perform the staging tests to validate the application. The staging cluster 150A' may be tagged or classified as the staging environment 102 of the application 140 to perform the staging tests to validate the application.

By this method, the overhead of deploying the production environment to create a staging environment is saved. The application or service may be deployed in the production environment faster and more efficiently. The resources, time and power consumption to deploy the application or service may be reduced.

Figure 5:
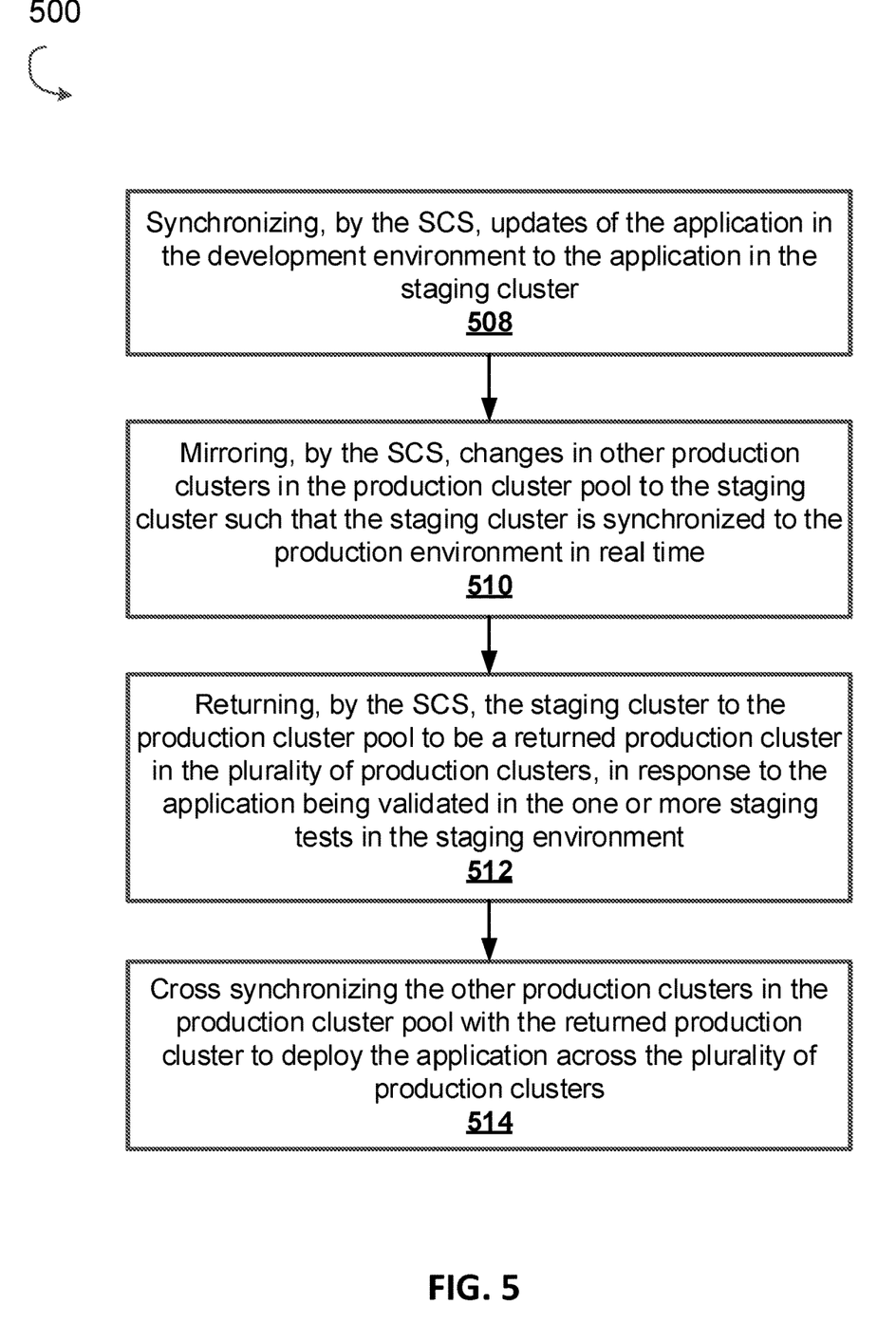
FIG. 5 is a flow diagram of an example method for using a staging cluster, in accordance with some embodiments of the present disclosure.

FIG. 5 is a flow diagram of an example method 500 for using a staging cluster, in accordance with some embodiments of the present disclosure. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by a computing device (e.g., the computing device 160 in FIGS. 1-3).

At block 508, the processing logic may synchronize, by the SCS, updates of the application in the development environment to the application in the staging cluster.

At block 510, the processing logic may mirror, by the SCS, changes in other production clusters in the production cluster pool to the staging cluster such that the staging cluster is synchronized to the production environment in real time.

At block 512, the processing logic may return, by the SCS, the staging cluster to the production cluster pool to be a returned production cluster in the plurality of production clusters, in response to the application being validated in the one or more staging tests in the staging environment. The returned production cluster is deployed with the application.

At block 514, the processing logic may cross synchronize the other production clusters in the production cluster pool with the returned production cluster to deploy the application across the plurality of production clusters.

Figure 6:
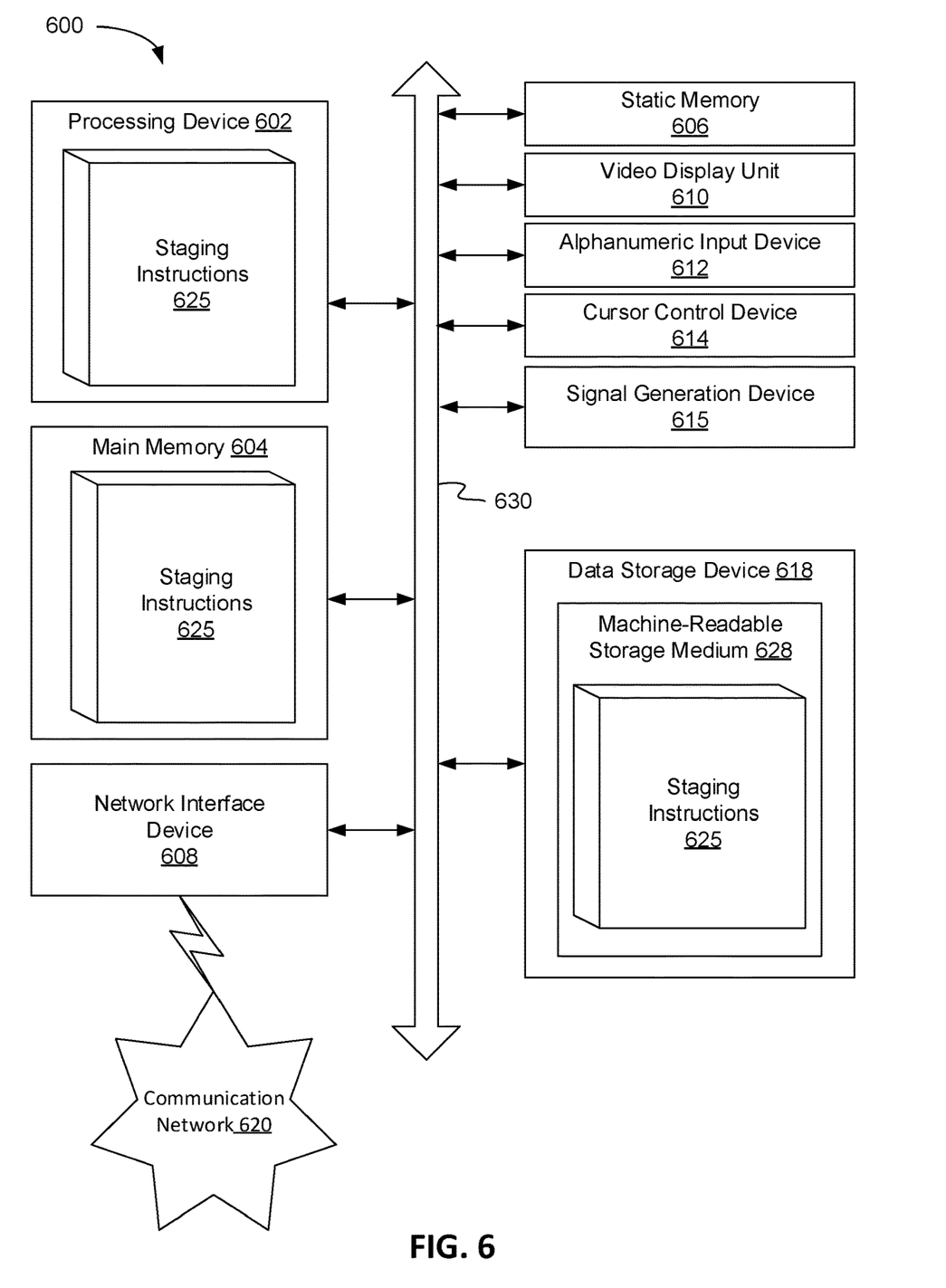
FIG. 6 is a block diagram of an example computing device, in accordance with some embodiments of the present disclosure.

FIG. 6 is a block diagram of an example computing system 600, in accordance with some embodiments of the present disclosure. A diagrammatic representation of a machine in the example form of the computer system 600 within which a set of instructions including staging instructions, for causing the machine to perform any one or more of the methodologies discussed herein. More specifically, the machine may execute a SCS to monitor a development of an application in a development environment of the application. The machine may execute the SCS to remove a production cluster of a plurality of production clusters from a production cluster pool in response to one or more development tests of the application having passed in the development environment, where the production cluster pool comprises the plurality of production clusters, and each production cluster includes a production environment of the application. The machine may execute the SCS to assign the production cluster to be a staging cluster including a staging environment of the application to perform one or more staging tests of the application.

In some embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, the computer system 600 may be representative of a computing device, such as the computing device 160 configured to perform one or more functions described herein.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute staging instructions 626, for performing the operations and steps discussed herein.

The data storage device 618 may include a machine-readable storage medium 628, on which is stored one or more sets of staging instructions 625 (e.g., software) embodying any one or more of the methodologies of functions described herein, including instructions to cause the processing device 602 to perform one or more of the functions described herein. The staging instructions 625 may also reside, completely or at least partially, within the main memory 604 or within the processing device 602 during execution thereof by the computer system 600; the main memory 604 and the processing device 602 also constituting machine-readable storage media. The staging instructions 625 may further be transmitted or received over a network 620 via the network interface device 608.

The machine-readable storage medium 628 may also be used to store instructions to perform a method for creating a staging cluster and/or using the staging cluster, as described herein. While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof

What is claimed is:

1. A method comprising:
   executing, by a processing device, a staging creation service (SCS) to monitor a development of an application in a development environment of the application;
   removing, by the SCS, a production cluster of a plurality of production clusters from a production cluster pool in response to one or more development tests of the application having passed in the development environment, wherein each production cluster of the plurality of production clusters comprises a production environment of the application; and
   assigning, by the SCS, the production cluster to be a staging cluster, wherein the staging cluster comprises a staging environment of the application to perform one or more staging tests of the application, and further comprises a just in time snapshot of the production environment.

2. The method of claim 1, wherein the application is promoted from the development environment to the staging environment.

3. The method of claim 2, further comprising
   synchronizing, by the SCS, updates of the application in the development environment to the application in the staging cluster.

4. The method of claim 1, further comprising mirroring, by the SCS, changes in other production clusters in the production cluster pool to the staging cluster such that the staging cluster is synchronized to the production environment in real time.

5. The method of claim 1, further comprising selecting, by the SCS, the production cluster in the plurality of production clusters based on a load of the production cluster.

6. The method of claim 1, further comprising
   returning, by the SCS, the staging cluster to the production cluster pool to be a returned production cluster in the plurality of production clusters, in response to the application being validated in the one or more staging tests in the staging environment, wherein the returned production cluster is deployed with the application.

7. The method of claim 6, further comprising
   cross synchronizing the other production clusters in the production cluster pool with the returned production cluster to deploy the application across the plurality of production clusters.

8. A system comprising:
   a memory;
   a processing device, operatively coupled with the memory, to:
      execute a staging creation service (SCS) to monitor a development of an application in a development environment of the application;
      remove, by the SCS, a production cluster of a plurality of production clusters from a production cluster pool in response to one or more development tests of the application having passed in the development environment, wherein each production cluster of the plurality of production clusters comprises a production environment of the application; and
      assigning, by the SCS, the production cluster to be a staging cluster, wherein the staging cluster comprises a staging environment of the application to perform one or more staging tests of the application, and further comprises a just in time snapshot of the production environment.

9. The system of claim 8, wherein the application is promoted from the development environment to the staging environment.

10. The system of claim 8, wherein the processing device is further to synchronize, by the SCS, updates of the application in the development environment to the application in the staging cluster.

11. The system of claim 8, wherein the processing device is further to mirror, by the SCS, changes in other production clusters in the production cluster pool to the staging cluster such that the staging cluster is synchronized to the production environment in real time.

12. The system of claim 8, wherein the processing device is further to select, by the SCS, the production cluster in the plurality of production clusters based on a load of the production cluster.

13. The system of claim 8, wherein the processing device is further to
   return, by the SCS, the staging cluster to the production cluster pool to be a returned production cluster in the plurality of production clusters, in response to the application being validated in the one or more staging tests in the staging environment, wherein the returned production cluster is deployed with the application.

14. The system of claim 13, wherein the processing device is further to
   cross synchronize the other production clusters in the production cluster pool with the returned production cluster to deploy the application across the plurality of production clusters.

15. A non-transitory computer-readable storage medium including instructions that, when executed by a processing device, cause the processing device to:
- execute a staging creation service (SCS) to monitor a development of an application in a development environment of the application;
- remove, by the SCS, a production cluster of a plurality of production clusters from a production cluster pool in response to one or more development tests of the application having passed in the development environment, wherein each production cluster of the plurality of production clusters comprises a production environment of the application; and
- assigning, by the SCS, the production cluster to be a staging cluster, wherein the staging cluster comprises a staging environment of the application to perform one or more staging tests of the application, and further comprises a just in time snapshot of the production environment.

16. The non-transitory computer-readable storage medium of claim 15, wherein the application is promoted from the development environment to the staging environment.

17. The non-transitory computer-readable storage medium of claim 15, wherein the processing device is further to synchronize, by the SCS, updates of the application in the development environment to the application in the staging cluster.

18. The non-transitory computer-readable storage medium of claim 15, wherein the processing device is further to mirror, by the SCS, changes in other production clusters in the production cluster pool to the staging cluster such that the staging cluster is synchronized to the production environment in real time.

19. The non-transitory computer-readable storage medium of claim 15, wherein the processing device is further to select, by the SCS, the production cluster in the plurality of production clusters based on a load of the production cluster.

20. The non-transitory computer-readable storage medium of claim 15, wherein the processing device is further to
- return, by the SCS, the staging cluster to the production cluster pool to be a returned production cluster in the plurality of production clusters, in response to the application being validated in the one or more staging tests in the staging environment, wherein the returned production cluster is deployed with the application; and,
- cross synchronize the other production clusters in the production cluster pool with the returned production cluster to deploy the application across the plurality of production clusters.

* * * * *

UNITED STATES PATENT AND TRADEMARK OFFICE
CERTIFICATE OF CORRECTION

| | | |
|---|---|---|
| PATENT NO. | : 12,079,110 B2 | Page 1 of 1 |
| APPLICATION NO. | : 17/703758 | |
| DATED | : September 3, 2024 | |
| INVENTOR(S) | : Pierre-Yves Chibon et al. | |

It is certified that error appears in the above-identified patent and that said Letters Patent is hereby corrected as shown below:

In the Specification

In Column 5, Line 43, please replace "150K" with -- 150A' --.
In Column 5, Line 53, please replace "150K" with -- 150A' --.
In Column 5, Line 55, please replace "150K" with -- 150A' --.
In Column 5, Line 57, please replace "150K" with -- 150A' --.
In Column 5, Line 66, please replace "150K" with -- 150A' --.
In Column 5, Line 67, please replace "150K" with -- 150A' --.
In Column 6, Line 28, please replace "150K" with -- 150A' --.
In Column 11, Line 36, please replace "thereof" with -- thereof. --.

Signed and Sealed this
Twentieth Day of May, 2025

Coke Morgan Stewart
*Acting Director of the United States Patent and Trademark Office*